United States Patent

[11] 3,619,510

[72] Inventors Leo Eduard Zegers; Frank De Jager, both of Emmasingel, Eindhoven, Netherlands

[21] Appl. No. 800,644
[22] Filed Feb. 19, 1969
[45] Patented Nov. 9, 1971
[73] Assignee U. S. Philips Corporation New York, N.Y.
[32] Priority Feb. 23, 1968
[33] Netherlands
[31] 6802653

[54] TIME DIVISION MULTIPLEX TRANSMISSION SYSTEM FOR THE TRANSMISSION OF SIGNALS BY MEANS OF PULSE CODE MODULATION
22 Claims, 9 Drawing Figs.

[52] U.S. Cl. 179/15 AP
[51] Int. Cl. H04j 3/04
[50] Field of Search 178/69.5; 179/15 BS, 15 BY, 15 BA; 325/38 A

[56] References Cited

UNITED STATES PATENTS

| | | | |
|---|---|---|---|
| 3,091,664 | 5/1963 | Tyrlick | 325/38.1 X |
| 3,305,636 | 2/1967 | Webb | 179/15 BY |

*Primary Examiner*—Ralph D. Blakeslee
*Attorney*—Frank R. Trifari

ABSTRACT: A time multiplex transmission system has a pseudorandom synchronization generator coupled to one of the multiplexer inputs. At the receiver, a synchronization detector is coupled to a demultiplexer output. A pulse is generated if there is no synchronization which causes the demultiplexer to lag behind the multiplexer by one channel per sync cycle until synchronization is achieved.

INVENTORS
LEO E. ZEGERS
FRANK DE JAGER
BY
Frank R. Trifari
AGENT

INVENTORS
LEO E. ZEGERS
FRANK DE JAGER
BY
Frank R. Trifari
AGENT

INVENTORS
LEO E. ZEGERS
FRANK DE JAGER
BY
[signature]
AGENT

INVENTORS
LEO E. ZEGERS
BY FRANK DE JAGER
AGENT

INVENTORS
LEO E. ZEGERS
FRANK DE JAGER
BY
AGENT

INVENTORS
LEO E. ZEGERS
FRANK DE JAGER
BY
AGENT

TIME DIVISION MULTIPLEX TRANSMISSION SYSTEM FOR THE TRANSMISSION OF SIGNALS BY MEANS OF PULSE CODE MODULATION

The invention relates to a transmission system comprising a transmitter and a receiver for the transmission of a number of signals in time division multiplex and by means of pulse code modulation, in particular delta modulation, the transmitter comprising channels which are operative in time division multiplex and consist of a number of signal channels and at least one synchronization channel, in which transmitter the signal pulses originating from the various signal channels and the synchronization pulses originating from the synchronization channel are distributed cyclically in each signal cycle, in which a number of signal intervals and also a synchronization interval occur in a cyclic sequence, over the separate intervals by means of a channel distributor, all the transmitted pulses being equal mutually and coinciding with various pulses from a series of equidistant clock pulses. The receiver comprises a clock frequency extractor for recovering the series of clock pulses from the received multiplex signals and furthermore comprises a number of channels corresponding to the number of channels in the transmitter and also consisting of a number of signal channels and at least one synchronization channel, the received multiplex signals being distributed cyclically over the separate channels by means of a channel distributor under the control of the recovered clock pulses, the synchronization channel comprising a synchronism detector which controls a setting circuit in the channel distributor, said setting circuit being blocked in the case of synchronism of the channel distributors in the transmitter and the receiver and, in the case of lost synchronisms setting the channel distributor in the receiver always at a different interval of the received signal cycle.

In such time division multiplex systems particular attention should be paid to the method of synchronization of the channel distributors in the transmitter and the receiver, since, when synchronism is lost, all the channels in the receiver are disturbed. It should be prevented in particular, that signal information or interference takes over and disturbs, respectively, the function of the synchronization channel.

It is the object of the invention to provide in time division multiplex transmission systems of the type mentioned in the preamble, a synchronization method which ensures a very reliable synchronization also in the case of a very high degree of interference of the multiplex signals in the transmission path, for example, with probabilities of interference of 1:10, and in the case of abnormal operating conditions of the signal channels, for example, channel failure or long-lasting channel overload.

The transmission system according to the invention is characterized in that a pulse pattern generator is included in the synchronization channel of the transmitter to generate a periodic synchronization pattern which, considered already over a time interval equal to its own period and for all the operating conditions of the signal channels, is uncorrelated with the signal pulses originating from said signal channels, the synchronism detector in the receiver comprising a pulse pattern converter which is provided with a shift register the contents of which are shifted under the control of the recovered clock pulses, said pulse pattern converter converting the received synchronization pulse pattern into a series of equidistant pulses, a network integrating said pulse series being connected to the output of the pulse pattern converter succeeded by a threshold device, the synchronism detector further comprising a test pulse generator which supplies test pulses with a repetition period which is larger than the integration time of the circuit, formed by the integrating network and the succeeding threshold device, said test pulses being applied to an inhibitor the inhibiting terminal of which is connected to the output of the threshold device and the output of which is connected to the setting circuit of the channel distributor.

When the synchronization pulse pattern is denoted by $s(t)$, its period by T, and any pulse pattern from the collection of signal pulse patterns of the signal channels by $a(t)$, the uncorrelated condition of $s(t)$ and $a(t)$ is to be understood to mean that the integral $$I(\tau)=\int_0^T s(t)a(t-\tau)dt \qquad (1)$$

is substantially zero for all the values, in formula:

$$I(\tau)\approx o; -\infty<\tau<\infty \qquad (2)$$

or in other words, that the probability that the synchronization pulse pattern $s(t)$ is found in the collection of signal pulse patterns $[a(t)]$ is particularly small.

The invention and its advantage will now be described in detail with reference to the figures.

FIG. 1 shows a transmission system according to the invention, while

FIG. 1 shows a time division multiplex transmission system for the transmission of 15 speech signals by means of the particular form of pulse code modulation which is known as delta modulation.

Figure 1:
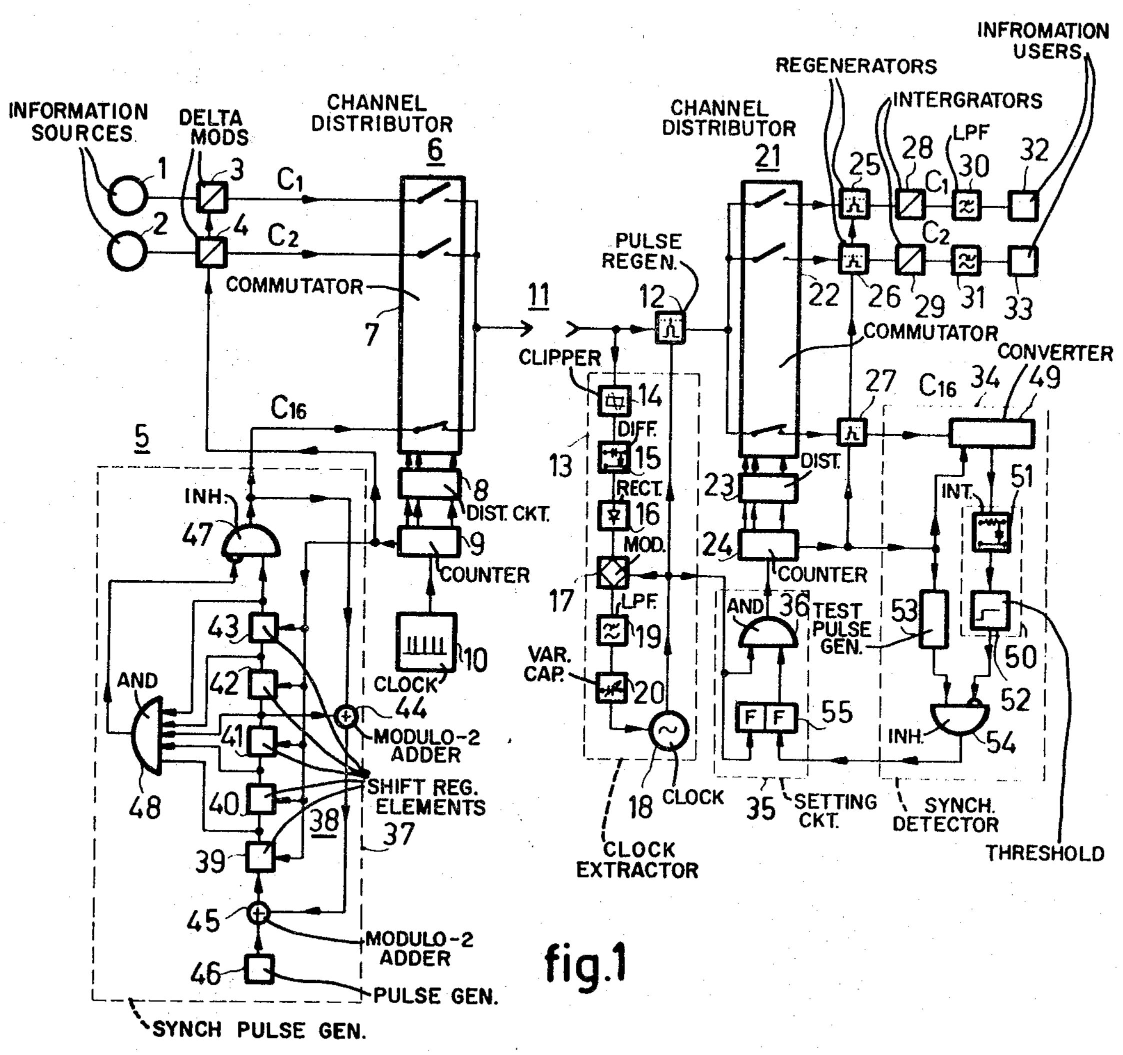

For this purpose the transmitter comprises 16 channels $C_1$–$C_{16}$ operative in time division multiplex, namely 15 speech channels $C_1$–$C_{15}$ and one synchronization channel $C_{16}$. Speech signals originating from information sources 1, 2, ... are applied in the speech channels $C_1$–$C_{15}$ to analog-to-digital converters in the form of delta modulators 3, 4, ... and converted therein into signal pulses which, in an alternation dependent upon the speech signals to be transmitted, are present and absent, while the synchronization channel $C_{16}$ comprises a synchronization pulse generator 5 which supplies synchronization pulses. The signal pulses originating from the speech channels $C_1$–$C_{15}$ and the synchronization pulses originating from the synchronization channel $C_{16}$ are distributed cyclically by means of a channel distributor 6 over the separate intervals of each signal cycle which is subdivided in 16 intervals of equal duration, 15 of which serving as signal intervals and one serving as a synchronization interval. The channel distribution 6 is of a conventional construction and in the embodiment shown it comprises a commutator 7 having 16 separate inputs for the 15 speech channels $C_1$–$C_{15}$ and the synchronization channel $C_{16}$, which commutator inputs are successively connected to the commutator output during the intervals allotted to the channels individually under the control of the output signals of a distributor circuit 8. The distributor circuit 8 is in the form, for differentiating full-wave example, of 16 AND gates not shown in FIG. 1, the inputs of which are connected to the stages of a 16-counter 9 to which clock pulses originating from a clock pulse generator 10 are applied in such manner that each AND gate supplies an output signal only in one particular position of the counter 9, so as to connect the commutator input associated with the AND gate to the commutator output. All the pulses occurring at the commutator output are mutually equal and coincide with various pulses from the series of clock pulses of the clock pulse generator 10, the clock pulse frequency being, for example, 320 kc./s. In order to control the delta modulator 3, 4, ... in the speech channels $C_1$–$C_{15}$ and the synchronization pulse generator 5 in the synchronization channel $C_{16}$, channel clock pulses are also derived from the counter 9; the channel clock pulse frequency and the signal cycle frequency are then 20 kc./s.

The multiplex signals of the transmitter are transmitted, through a transmission path 11, to the receiver and are applied therein to a pulse regenerator 12 for regenerating the received signal pulses according to shape and instants of occurring. For that purpose the receiver comprises a clock frequency extractor 13 for recovering the series of clock pulses from the received multiplex signals. In the embodiment shown the clock frequency extractor 13 comprises a limiter 14, which is succeeded by a differentiating network 15 for the limited signal pulses and a fullwave rectifier 16 which is connected to one input of a phase discriminator 17. The other input of the phase discriminator 17 is connected to a local clock pulse generator 18, while the output is connected to a smoothing filter in the form of an integrating network 19, the output voltage of which is applied as a control voltage to a frequency corrector 20 constructed, for example, as a variable reactance, for the automatic phase stabilization of the local clock pulse generator 18 at the clock pulse generator 10 at the transmitter end. The local clock pulses thus obtained are applied to an input of the pulse regenerator 12.

The receiver further comprises, like the transmitter, 16 channels consisting of 15 speech channels $C_1$–$C_{15}$ and one synchronization channel $C_{16}$, the received and regenerated multiplex signals being distributed cyclically over the separate channels by means of a channel distributor 21 which, as far as its construction and control are concerned, corresponds to the channel distributor 6 at the transmitter end, and which also comprises a commutator 22, a distributor 23 and a 16-counter 24, the local clock pulses being applied to the counter 24. The pulses associated with the various channels $C_1$–$C_{16}$ appear at the commutator outputs and are applied in all channels to channel pulse regenerators 25, 26, ... 27, which are controlled by the channel clock pulses derived from the counter 24.

In the speech channels $C_1$–$C_{15}$, the regenerated signal pulses are applied to digital-to-analog converters in the form of integrating networks, 28, 29, ... associated with the delta modulators and the output voltage of which, after filtering in low-pass filters 30, 31, ..., is applied to individual users 32, 33, ... In the synchronization channel $C_{16}$, the regenerated synchronization pulses are applied to a synchronism detector 34 which controls a setting circuit 35 in the channel distributor 21. In the embodiment shown the setting circuit 35 comprises an AND-gate 36 to which are applied on the one hand the local clock pulses and on the other hand a control signal generated by the synchronism detector 34. In the case of synchronism of the channel distributors 6 and 21 in the transmitter and the receiver, that is to say with corresponding positions of commutators 7, 22 so that the pulses of each channel at the transmitter end are applied correctly to the associated channel at the receiver end, the setting circuit 35 is blocked which means that the control signal which is then generated allows the local clock pulses to pass the AND-gate 36 without hindrance. When the multiplex system is actuated for the first time or when synchronism is lost, the control signal which is then generated prevents the passage of the local clock pulses through the AND-gate 36, so that the channel distributor 21 at the receiver end is lagging with respect to the channel distributor 6 at the transmitter end and thus always sets at a different interval of the received signal cycle until synchronism is obtained.

In order to obtain in all operating conditions a reliable synchronization, that is to say, a synchronization which is substantially not influenced by signal pulses or interference pulses according to the invention, a pulse pattern generator 37 is included in the synchronization channel $C_{16}$ of the delta modulation time multiplex system shown to generate a periodic synchronization pulse pattern which, considered already over a time interval equal to its own period and for all the operating conditions of the signal channels $C_1$–$C_{15}$, is uncorrelated with the signal pulses originating from the said signal channels.

In the embodiment shown in FIG. 1, the pulse pattern generator 37 is constructed as a feedback shift register 38 having a number of shift register elements 39, 40, 41, 42, 43 the contents of which are shifted with a constant shift period D under the control of the channel clock pulses originating from the counter 9, and having a modulo-2-adder 44 one input of which is connected to the output of the shift register element 41 and the other input of which is connected to the output of the shift register 38, the output of said modulo-2-adder 44 being connected to a second modulo-2-adder 45 which is connected to the input of the shift register and to which is also connected a source 46 of constant signal value.

If, when the pulse pattern generator 37 is put into operation, the source 46 supplied a constant signal having an amplitude equal to that of a pulse at the shift register 38, the shift register 38, as a result of the feedback coupling, will start generating a series of pulses having an each time recurring period T. Mathematically it can be proved that the pulse pattern, occurring when $n$ shift register elements are used and with suitable choice of the place of the modulo-2-adders, has a period $(2^n-1)$D, where D is the length of the shift period. In the embodiment shown, in which $n=5$, the period T of the synchronization pulse pattern is $(2^5-1)D=D$, while the synchronization pulse pattern at the output of the shift register 38, has the shape shown in FIG. 2 at *a*.

In order to prevent in the practical embodiment of the pulse pattern generator 37 shown in FIG. 1 a tendency of undesired generation of an uninterrupted series of pulses, which might occur in particular circumstances, a normally opened inhibitor 47 is provided between the output of the shift register and the feedback coupling, the inhibiting terminal of which is connected to an AND-gate 48 to which the outputs of all the shift register elements 39–43 are connected. If actually the pulse pattern generator 37 would be in that condition in which an uninterrupted series of pulses is generated, then a pulse appears simultaneously at the outputs of all the shift register elements 39–43 so that at the output of the AND-gate 48 a pulse appears which closes the inhibitor 47 and this immediately interrupts the continuation of this undesired condition of the pulse pattern generator 37.

According to the invention, a pulse pattern converter 49 is incorporated in the synchronism detector 34 of the receiver, which converter comprises a shift register the content of which is shifted under the control of the recovered clock pulses and which converts the received synchronization pulse pattern into a series of equidistant pulses, a circuit 50 which is constituted by a network 51 integrating the equidistant pulse series and succeeded by a threshold device 52 being connected to the output of the pulse pattern converter 49, the synchronism detector 34 further comprising a test pulse generator 53 which supplies test pulses with a repetition period which is larger than the integration period of the integration circuit 50, said test pulses being applied to an inhibitor 54, the inhibiting terminal of which is connected to the output of the threshold device 52 and the output of which is connected to the setting circuit 35 of the channel distributor 21.

The test pulse generator 53 in the receiver shown in FIG. 1 is constructed as a counter which is supplied by the channel clock pulses of the 16-counter 24 and which reaches its final position after supplying a number of channel clock pulses, in which position it supplies to the inhibitor 54 a test pulse having a duration equal to the duration of a local clock pulse. At the inhibiting terminal of the inhibitor 54 is applied the output signal of the threshold device 52 which is present only when, by integration of the equidistant pulse series at the output of the pulse pattern converter 49, the integration signal at the output of the integrating network 51 exceeds the threshold value of the threshold device 52. The repetition period of the test pulses, given by the number of channel clock pulse periods, is chosen to be larger than the integration period of the integration circuit 50, which integration period is given by the time interval which the integration signal needs to reach the threshold value, starting from an integration signal equal to zero, in the case of integration of the equidistant series of pulses. In FIG. 1 the construction of the pulse pattern converter 49 is not shown in detail, but this will be described elaborately in the detailed embodiments of the synchronism detector in the following Figures.

As a result of the action of the pulse pattern converter 49, an equidistant pulse series will appear at its output only when the synchronization pulse pattern is applied, which equidistant pulse series, after integration, supplies an integration signal which exceeds the threshold value, under the influence of which exceeding the threshold device 52 supplies an output signal which closes the inhibitor 54, so that the passage of the test pulses through the inhibitor 54 to the setting circuit 35 of the channel distributor 21 is prevented. In the case of supply of any other pulse patterns, for example, originating from a signal channel, no equidistant pulse series appears at the output of the pulse pattern converter 49 and the integration signal does not reach the threshold value, so that no signal is present at the inhibiting terminal of the inhibitor 54. The test pulses then pass on to the setting circuit 35 without hindrance and serve therein as reset pulses for a bistable trigger 55 to which the local clock pulses are applied as set pulses. In the absence of the test pulses, the local clock pulses hold the bistable trigger 55 in its operating condition in which the trigger 55 supplies a control signal which keeps the AND-gate 36 opened for the local clock pulses, while of the contrary a test pulse passed without hindrance resets the bistable trigger 55 to its rest position, in which the trigger 55 supplies no control signal and the AND-gate 36 is closed for the local clock pulses. The channel distributor 21 in the receiver then remains in a particular position while the channel distributor 6 in the transmitter switches to a following position. The local clock pulse immediately succeeding the test pulse resets the bistable trigger 55 to its operating condition so that the channel distributor 21 in the receiver then switches on under the control of the local clock pulses, until a following test pulse passed without hindrance through the inhibitor 54 occurs, the described setting of the channel distributor 21, in this case: delay over one interval of the signal cycle, being repeated. These variations of the setting of the channel distributor 21 are repeated until synchronism of the channel distributors 6 and 21 in the transmitter and the receiver is obtained, in which as a result of the continuous supply of the synchronous pulse pattern to the pulse pattern converter 49 the inhibitor 54 remains closed for the test pulses and the setting circuit 35 which is then blocked produces no further setting of the channel distributor 21.

By using the measures according to the invention, it is reached in this manner in the delta modulation time division multiplex system shown that reliable synchronization is obtained in all circumstances as will now be described in greater detail. In this detailed description the presence of a pulse in a pulse pattern will be denoted by "1" and the absence of a pulse will be denoted by "0."

The synchronization pulse pattern used in this time division multiplex system which in an arbitrary time interval of the length of its period has the following form (compare *a* in FIG. 2):

0000011100100001010111101101010011 is distinguished unambiguously from the signal pulse patterns which may occur in all operating conditions of the speech channels $C_1$–$C_{15}$ at the transmitter end and which, when using delta modulation, may be subdivided in the following types:

a. rest patterns which occur in the absence of a speech signal, for example, during a speech pause, and which may have the following forms:

1010101010101010 ...

... 1100110011001100 ...

b. defect patterns which occur in the case of failure of a channel $C_1$–$C_{15}$ or in the case of overload of a delta modulator 3, 4, ... in which the pulses are continuously present or continuously absent for long time intervals.

c. speech patterns in which the pulses are present and absent in an alternation fully determined by the form of the speech signal to be transmitted.

In considering the above signal pulse patterns, it appears that in all cases occurring in delta modulation the alternation of presence and absence of the pulses in the signal pulse patterns has an ordered character, whereas in the synchronization pulse pattern considered over an arbitrary time interval of the length of its period T, the pulses are present and absent in a pseudorandom alternation.

At the receiver end also the synchronization pulse pattern is distinguished unambiguously from all the signal pulse patterns in which as a result of interferences in the transmission path 11 interference pulses occur which manifest themselves in the regenerated signal pulse patterns by suppression or addition of pulses. Actually, also in the case of very high probabilities of interference, for example, of 1:10, the average time between two successive interference pulses in a signal pulse pattern of a speech channel $C_1$–$C_{15}$ is considerably longer than the average time between two successive signal pulses, so that the interference pulses influence the natural ordered character of the signal pulses only very slightly. Likewise, the interference pulses have only a very small influence on the pseudorandom character of the synchronization pulse pattern and therefore the significant distinction between the synchronization pulse pattern and the signal pulse patterns occurring in all operating conditions is reduced only to a very small extent by the interferences in the transmission path 11.

While using this significant distinction, it is made possible to distinguish the synchronization pulse pattern in the receiver very rapidly and with great certainty by means of the pulse pattern converter 49 which generates a series of equidistant pulses, only when the synchronization pulse pattern is applied. Actually, by integration of the equidistant pulse series the integration signal at the output of the integrating network 51 very rapidly reaches the threshold value of the threshold device 52 and after exceeding said value, the synchronous switching onward of the channel distributors 6 and 21 in the transmitter and receiver is effected by blocking the setting circuit 35 while, when any other signal pulse pattern is applied, a large number of the pulses, on an average half the number of pulses, is omitted from the desired equidistant pulse series at the output of the pulse pattern converter 49, so that the integration signal does not reach the threshold value and the setting circuit 35, which is not blocked then, sets the channel distributor 21 in the receiver each time at another interval of the received signal cycle until synchronism is obtained.

By using the measures according to the invention, synchronism of the channel distributors 6 and 21, in the transmitter and the receiver is reached in this manner with great certainty in a short period of time even when the probabilities of interference are 1:10. For example, to distinguish the synchronization pulse pattern an integration time of 3 to 4 periods of the synchronization pulse pattern is amply sufficient, which means that in the time division multiplex system described synchronism is obtained in the most unfavorable case after 16×(4×31D), where D is the channel clock pulse period of 0.05 msec., so after approximately 100 msec. even with a probability of interference of 1:10, said short searching period falling amply within the range of approximately 1 sec. which may be permitted for the transmission of speech signals.

The synchronism detectors 34 with the pulse pattern converter 49 shown only diagrammatically in FIG. 1 will now be described in greater detail with reference to the following Figures, in which for clarity the adjacent components of the synchronism detector 34 are shown again and have been given the same reference numerals as in FIG. 1.

Figure 3:
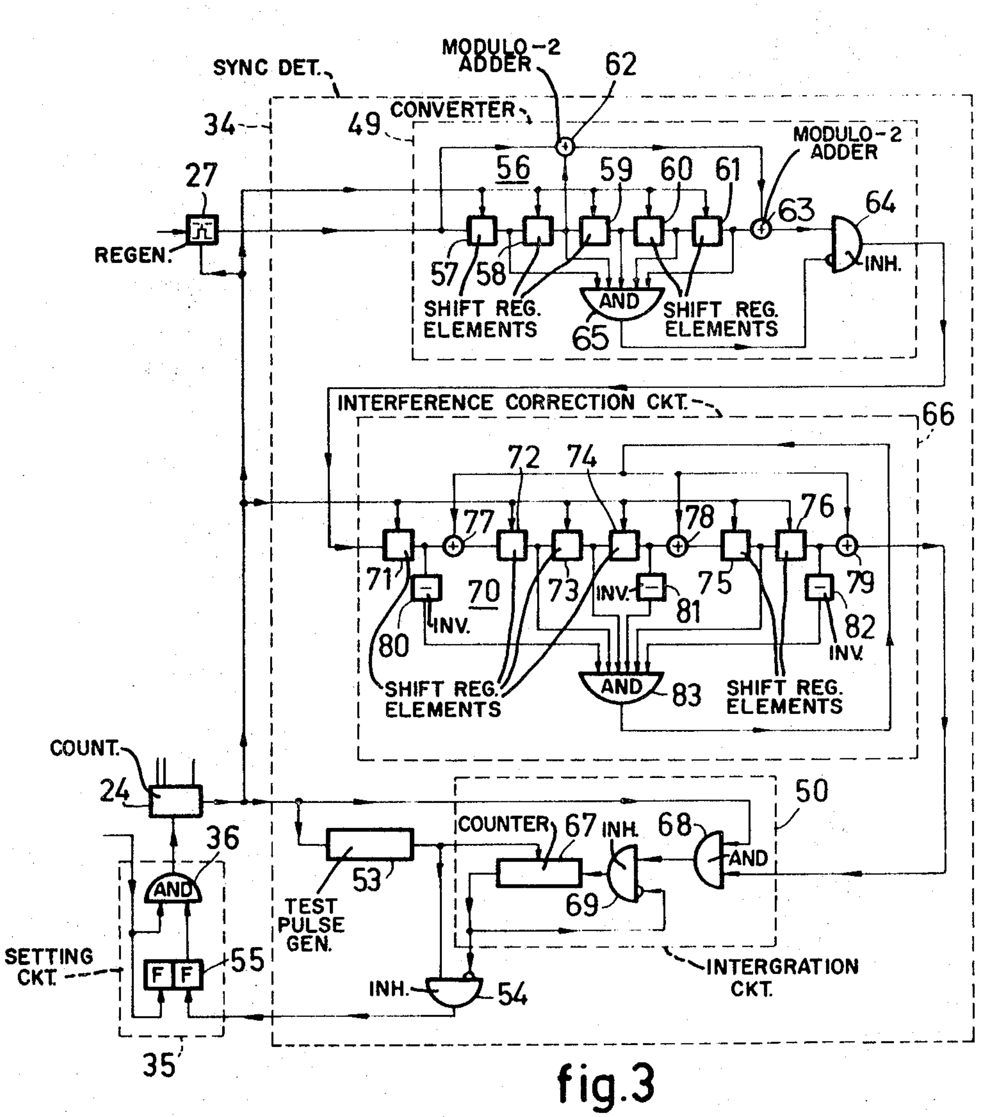

The pulse pattern converter 49 shown in FIG. 3 is constructed as the inverse circuit of the pulse pattern generator 37 in the transmitter. In the embodiment shown the pulse pattern converter 49 comprises a feed-forward shift register 56 having a number of shift register elements 57, 58, 59, 60, 61, the contents of which are shifted with a constant shift period D under the control of the local channel clock pulses of the 16-counter 24, and having a modulo-2-adder 62, one input of which is connected to the input of the shift register 56 and the other input of which is connected to the output of the shift register element 58, the output of said modulo-2-adder 62 being connected to a second modulo-2-adder 63 connected to the output of the shift register 56. The operation with the pulse pattern converter 49 constructed as the inverse circuit performs is the inverse of the operation with which the synchronization pulse pattern is formed in the pulse pattern generator 37 at the transmitter end from an uninterrupted series of pulses which in this case is supplied by the source 46 of the constant signal value. Consequently the supply of the synchronization pulse pattern to the pulse pattern converter 49 will result in an uninterrupted series of equidistant pulses at the output of the pulse pattern converter 49.

In order to ensure that the pulse pattern converter 49 generates an equidistant pulse series only when the synchronization pulse pattern is applied, a normally opened inhibitor 64 is arranged between the modulo-2-adder 63 on the shift register output and the output of the pulse pattern converter 49 the inhibiting terminal of said inhibitor 64 being connected to an AND-gate 65 to which the outputs of all the shift register elements 57–61 are connected. Actually, besides the synchronization pulse pattern the only signal pulse pattern which converts said inverse circuit 49 also into an equidistant pulse series, itself also is an uninterrupted pulse series, but a pulse simultaneously appears at the outputs of all the shift register elements 57–61 only when said uninterrupted pulse series is applied to the inverse circuit so that at the output of the AND-gate 65 a pulse appears which closes the inhibitor 64, thus preventing in this case the occurrence of the equidistant pulse series at the output of the pulse pattern converter 49. Consequently, only the supply of the synchronization pulse pattern results in an equidistant pulse series at the output of the pulse pattern converter 49.

This equidistant pulse series is applied to the integration circuit 50, through an interference connection circuit 66 to be described. In the embodiment shown said circuit 50 is constructed entirely digitally. The integration now takes place by means of a counter 67, the pulse series to be integrated being applied to the counter input through an AND-gate 68 by means of which each pulse to be integrated having a width D is replaced by a channel clock pulse having a width D/2, the trailing edges of the test pulses of the counter 53 the repetition period of which in fact is longer than the integration time of the circuit 50, being used as reset pulses for the counter 67. In this case the threshold value of the threshold device 52 in FIG. 1, is realized by means of the final position of the counter 67, in which said counter 67 supplies an output signal which is applied to the inhibiting terminal of an inhibitor 69 on the counter input and prevents a further supply of the equidistant pulse series by closing said inhibitor 69, so that the counter 67 remains in its final position. This output signal is also used to prevent the supply of the test pulses to the setting circuit 35 by means of the inhibitor 54, and thus to block the setting circuit 35. The counter 67 is reset to its initial position and the inhibitor 69 at the counter input is opened again by the trailing edge of the test pulse from the test pulse generator 53. The integration of the equidistant pulse series in the counter 67 may then be started again and since the repetition period of the trailing edges of the test pulses used as reset pulses—taking into account also the value of the probability of interference—is chosen to be larger than the integration period, the threshold value formed by the final position of the counter 67 is amply reached in the case of synchronism before the following test pulse appears. Thus the maintenance of synchronism is ensured when the synchronization pulse pattern is applied to the synchronism detector 34.

In this manner a simple and reliable synchronism detector is obtained which also offers the advantage that the searching time which is short as it is and the reliability which is large as it is, respectively, can be further reduced and increased, respectively.

The inverse circuit 49 comprises in fact a number of paths along which a supplied pulse can reach the output, the delay times in said paths differing mutually. These paths are: from the input directly through both modulo-2-adders 62, 63 to the output, delay time 0; from the input through shift register elements 57, 58 to modulo-2-adder 62 and thence through modulo-2-adder 63 to the output, delay time 2D; from the input through all shift register elements 57–61 and modulo-2-adder 63 to the output, delay time 5D.

If now, in the case of synchronism, a single interference pulse appears in the synchronization pulse pattern with a given probability of interference, said interference pulse occurs three times at the output of the inverse circuit 49, namely directly and after delay times of 2D and 5D, which consequently means an increase of the probability of interference of the said single interference pulse by a factor 3. At the output of the pulse pattern converter 49 each single interference pulse results in the missing of a pulse in the equidistant pulse series, so in the occurrence of a 0. By means of the interference correction circuit 66, the increased probability of interference of this type of interference pulse in the case of synchronism is reduced to zero in a simple manner.

For that purpose, the interference correction circuit 66 comprises a shift register 70 controlled by the local channel clock pulses and having a number of shift register elements 71, 72, 73, 74, 75, 76 which exceeds the number of shift register elements 57–61 in the pulse pattern converter 49 by one. Viewed in the direction of shifting, modulo-2-adders 77, 78, 79 are included after the last but 5, after the last but 2, and after the last shift register element, respectively 71, 74, 76, while the outputs of said shift register elements 71, 74, 76 are connected, through inverters 80, 81, 82, and those of the remaining shift register elements 72, 73, 75 are connected directly, to the input of an AND-gate 83, the output of which is connected to an input of each modulo-2-adder 77, 78, 79.

When at a given instant a single interference pulse, so a O, appears at the output of the pulse pattern converter 49, said interference pulse is shifted in the last shift register element 76 of the interference correction circuit 66 a duration 6D after this instant and the version of said interference pulse delayed over 2D and 5D, respectively, is shifted in shift register element 74 (the last but 2) and shift register element 71 (the last but 5) respectively. The remaining shift register elements 72, 73, 75 then contain no interference pulses so that the contents of the shift register 70 may then be represented by 011010, with which contents an output signal appears at the AND-gate 83 which is shifted through the modulo-2-adder 77, 78, 79 by the next shift pulse, instead of the interference pulses 0, into the shift register elements 72, 75 succeeding the modulo-1-adders 77, 78 and also appears at the output of the shift register 70, so that the single interference pulse and its versions delayed over 2D and 5D do not appear at the output of the interference correction circuit 66.

The interference correction circuit 66 this effects, in the case of synchronism, a considerable reduction of the influence of the interference pulses on the equidistant pulse series used for integration but, in the absence of synchronism, the interference correction circuit 66 has substantially no influence on the character of the nonequidistant pulse series then presented for integration.

In this manner a reduction of the searching time for obtaining synchronism, already being short, becomes possible in that the integration time, due to the reduced influence of interference pulses in the case of synchronism, can now be reduced while, in spite of this reduction of the integration time, the resulting synchronism is maintained with greater certainty.

Figure 4:
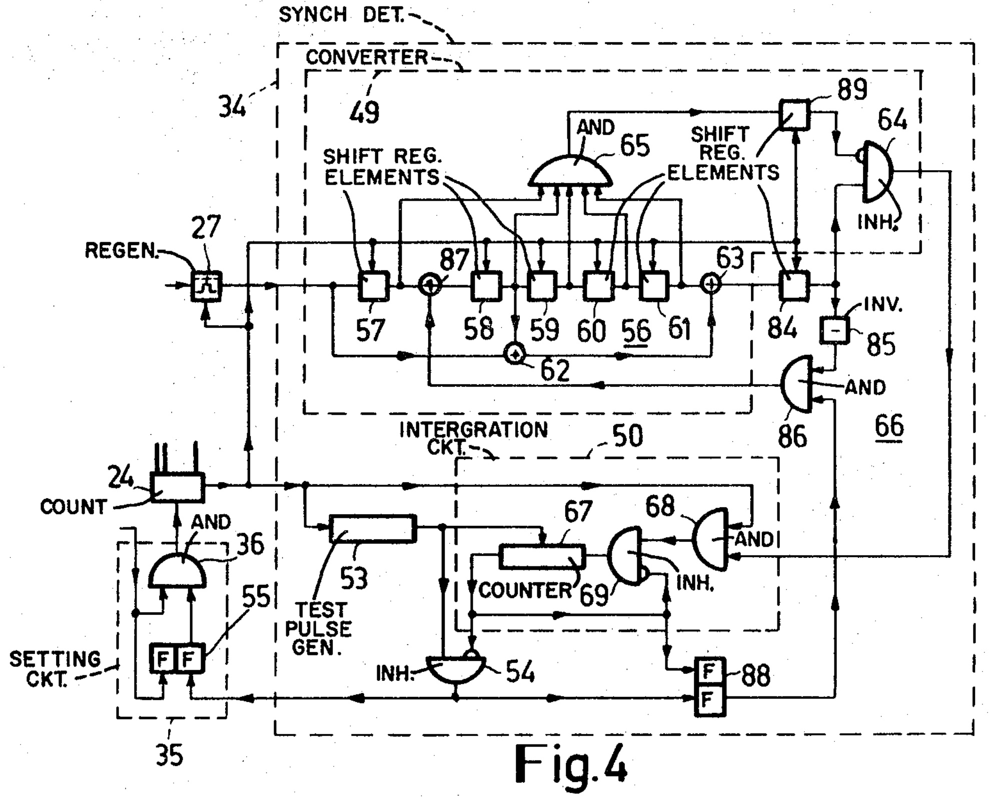
FIGS. 3 to 7 show several embodiments of the synchronism detectors according to the invention used in the receiver of the transmission system shown in FIG. 1.

FIG. 4 shows a variation of a synchronism detector shown in FIG. 3—which corresponding elements have been given like reference numerals. The synchronism detector of FIG. 4 differs from that shown in FIG. 3 in the construction of the interference correction circuit 66.

In this case the interference correction circuit 66 is formed by providing between the output of the feed-forward shift register 56 and the inhibitor 64, an extra shift register element 84 the output of which is also connected to an input of an AND-gate 86 through an inverter 85, while the output of the AND-gate 86 is connected to an input of the modulo-2-adder 87 which is arranged after the first shift register element 57 in the feed-forward shift register 56. The second input of the AND-gate 86 is connected through a storage element in the form of a bistable trigger 88 to the output of the counter 67 in the circuit 50. When the threshold is reached, the output signal of the counter 67 sets the trigger 88 to its operating condition, the trigger 88 supplying a signal which keeps the AND-gate 86 opened, while in the absence of synchronism a test pulse which is then passed without hindrance through the inhibitor 54 resets the trigger 88 to its rest condition, no output signal being present and the AND-gate 86 being closed.

When in the case of synchronism a single interference pulse appears at a given instant in the form of a 0 at the output of the feed-forward shift register 56, an interference pulse is simultaneously present also at the input of the shift register. A period of time D afterwards, said interference pulse 0 at the output of the shift register is shifted into the extra shift register element 84 by the shifting pulse then occurring, and the interference pulse at the input of the shift register is shifted into the first shift register element 57. At the output of the inverter 85, the inverse of the interference pulse 0, so a 1, then appears which corresponds to a desired pulse at the output of the shift register and which produces an inversion of the contents of the second shift register element 58 through the AND-gate 86 which is opened in the case of synchronism and the modulo-2-adder 87 when the next shift pulse appears. As a result of this the formation of the versions of the interference pulse delayed over 2D and 5 D described above is prevented. In this manner the increased probability of interference of a single interference pulse caused by the inverse circuit 49, is reduced to the probability of interference of one single interference pulse itself by means of the interference correction circuit 66, in the case of synchronism.

In the absence of synchronism the interference correction circuit 66 is made inoperative by closing the AND-gate 86 under the control of the test pulses then passed without hindrance through the inhibitor 54. If, actually, the AND-gate 86 would be opened also in the absence of synchronism, the inverse circuit 49 comprises, in addition to the feed-forward coupling, also a feedback coupling so that in circumstances the inverse circuit 49 shows a possible tendency of an undesired generation of a specific pulse pattern which is combined with the applied pulse pattern. The supply of the synchronization pulse pattern to the generating inverse circuit 49 would then no longer result in the desired equidistant pulse series at the output of the pulse pattern converter 49 which, naturally, cannot be permitted since synchronism would not be obtained in that case.

Although in the case of synchronism the feedback coupling is present, the probability of occurrence of the conditions which might lead to undesired generation is negligibly small just in this case in which exclusively the synchronization pulse pattern is applied and the interference correction circuit 66 produces an effective interference correction, while in addition a possibly starting generation is very rapidly interrupted in that the integration signal does not reach the threshold value and consequently the feedback coupling is interrupted under the control of the test pulses which are then passed without hindrance by the inhibitor 54.

Furthermore, a shift register element 89 for compensating the delay caused by the extra shift register element 84 is also provided between the output of the AND-gate 65 and the inhibiting terminal of the inhibitor 64, so that a premature closure of the inhibitor 64 is prevented.

In this manner and in the case of synchronism, a reduction of the possibility of interference of a single interference pulse is obtained in the synchronism detector shown by means of a simple interference correction circuit 66 so that the reliability of the resulting synchronism is increased.

It is to be noted that also with pulse pattern converters having a structure differing from that shown in FIGS. 3 and 4, the interference correction circuit 66, used in FIG. 4 may be utilized. A particularly simple pulse pattern converter with which the synchronism pulse pattern is converted into a series of equidistant pulses and in which said interference correction circuit may be used, is obtained, for example, by coupling the two terminals of a shift register which comprises a number of shift register elements corresponding to the number of channel clock pulse periods in the synchronization pulse pattern, so in this case 31, to the inputs of a modulo-2-adder. For practical reasons, however, the pulse pattern converter 49 shown in FIGS. 3 and 4 is to be preferred.

Figure 5:
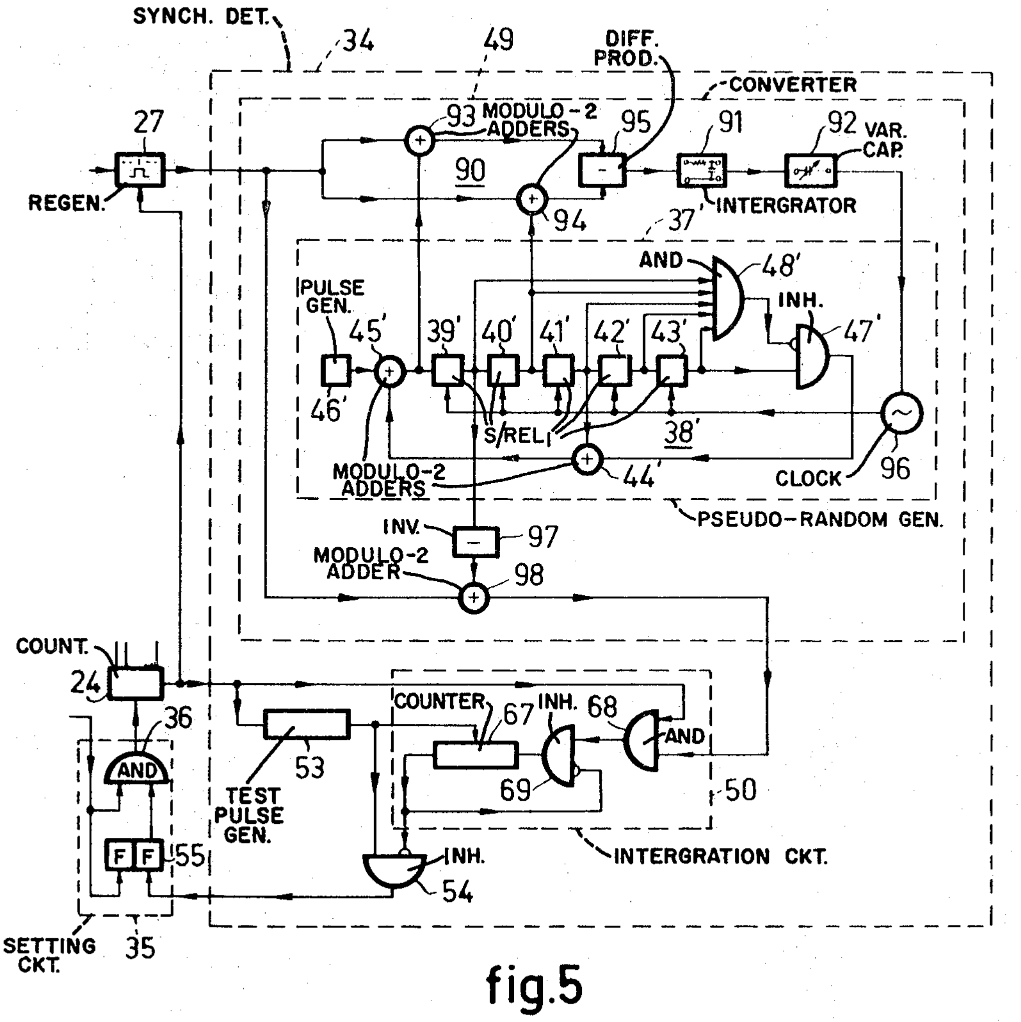
Figure 6:
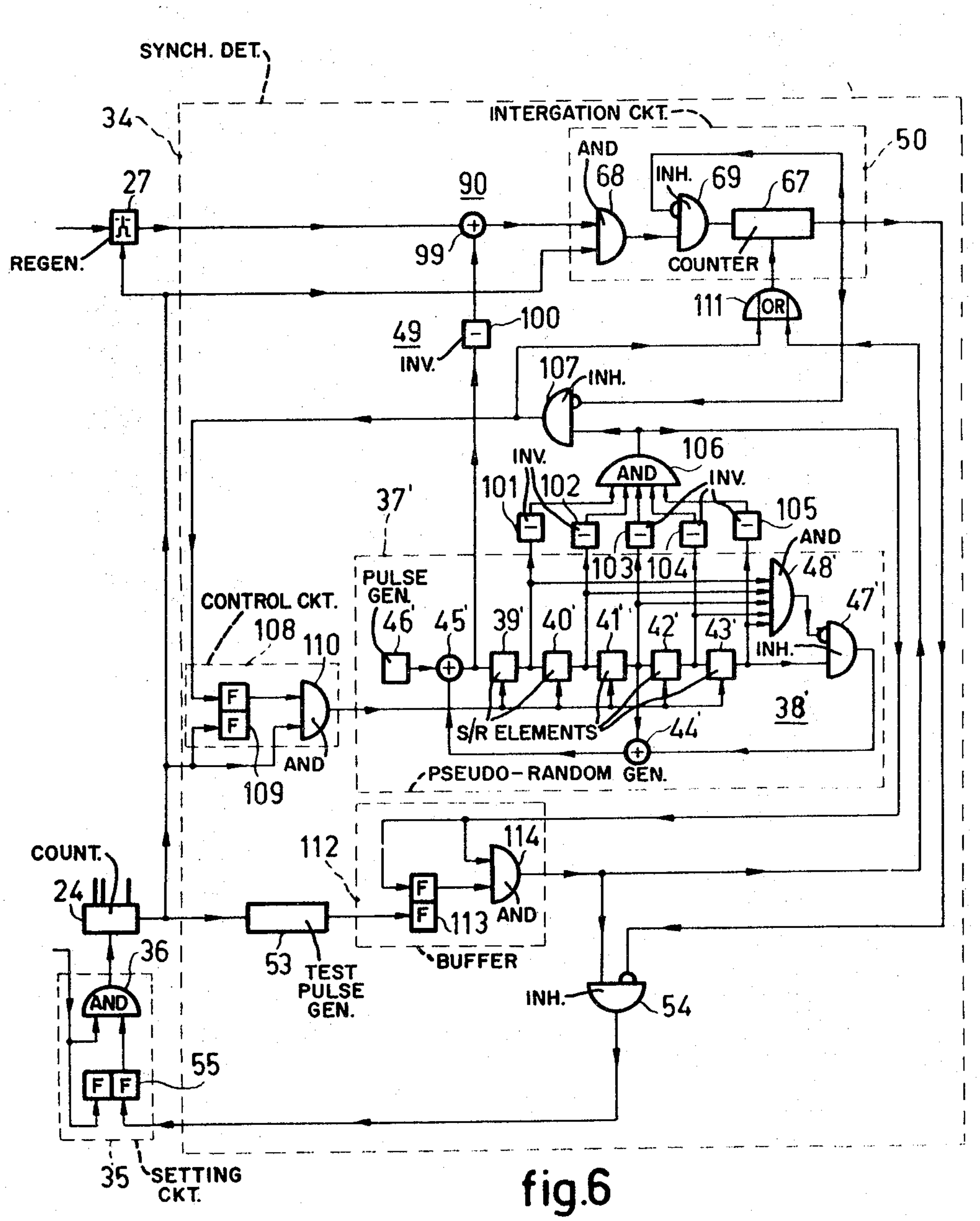

FIGS. 5 and 6 show synchronism detectors in which the uncorrelated condition of the synchronization pulse pattern $s(t)$ with an arbitrary pulse pattern $a(t)$ from the collection of signal pulse patterns is elegantly used for constructing the pulse pattern converter. The remaining parts of said synchronism detectors corresponds to those of the synchronism detectors shown in FIGS. 3 and 4, and are therefore referred to with the same reference numerals.

The pulse pattern converter 49 shown in FIG. 5 comprises a modulation device 90 to which are applied the received pulse pattern and also the locally obtained synchronization pulse pattern originating from a local pulse pattern generator 37' which corresponds to the pulse pattern generator 37 in the transmitter, the output of the modulation device 90 being connected to a smoothing filter in the form of an integrating network 91 which for automatic phase correction is connected to the frequency-determining member 92 of the local pulse pattern generator 37'.

The local pulse pattern generator 37' of the pulse pattern converter 49 shown in FIG. 5 is constructed in the same manner as the pulse pattern generator in the transmitter, corresponding elements being denoted by the same reference numerals but being provided with an index at the receiver end. Furthermore, the modulation device 90 in this embodiment has a double construction, namely in the form of two modulo-2-adders 93, 94 which are connected, with an input in parallel arrangement, to the input of the pulse pattern converter 49 and with their outputs to a linear difference producer 95 the output voltage of which is applied to the integrating network 91. The integration voltage of the integrating network 91 controls a frequency corrector 92 which is constructed as a variable reactance and is connected to an oscillator 96 serving as a local channel clock pulse generator. The local synchronization pulse pattern which corresponds in form but does not correspond in phase with the synchronization pulse pattern generated at the transmitter end, is applied to the second input of the modulo-2-adders 93, 94 which locally obtained synchronization pulse pattern will be denoted by $s(t-\tau)$, where $\tau$ is the mutual time shift of the pulse patterns. In particular the local synchronization pulse pattern $s(t-\tau+D)$ advanced over one shift period D is applied to modulo-2-adder 93 while the local synchronization pulse pattern $s(t-\tau-D)$ delayed over one shift period D is applied to modulo-2-adder 94, said advanced and delayed pulse patterns, respectively, being derived from the outputs of modulo-2-adder 45' and shift register element 40', respectively.

Figures 2A, 2B, 2C:
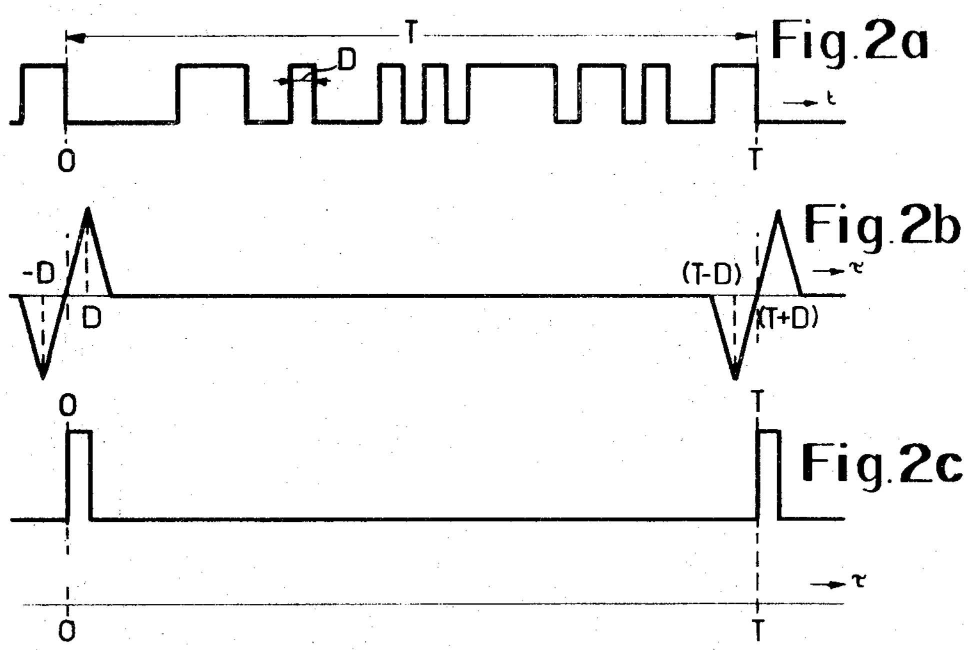
FIG. 2 shows a few time diagrams to explain the transmission system according to the invention.

At the output of the integrating network 91, the time constant of which is at least of the same order of magnitude as the period T of the synchronization pulse pattern $s(t)$, an integration voltage will appear, when an arbitrary pulse pattern $a(t)$ is applied to the pulse pattern converter 49, is substantially zero for all the values $\tau$ on the basis of the uncorrelated condition of $a(t)$ and $s(t)$ but which, when the synchronization pulse pattern $s(t)$ is applied has a variation as a function of $\tau$ shown in FIG. 2 with a radial symmetry for $\tau=0$ and a period equal to T. By applying said integration voltage as a control voltage to the frequency corrector 92, an accurate phase stabilization of the local clock pulse oscillator 96 on the phase of the synchronization pulse pattern generated at the transmitter end is obtained. The double construction of the modulation device 90 presents the advantage that with this phase stabilization the mutual time shift $\tau$ of the synchronization pulse patterns at the transmitter and receiver ends can be reduced substantially to zero.

The local synchronization pulse pattern is derived from the output of the shift register element 39' and applied through an inverter 97 to a modulator 98 in the form of a modulo-2-adder to which also the received pulse pattern is applied. In the stabilized condition of the local pulse pattern generator 37' the desired series of equidistant pulses occurs at the output of the said modulo-2-adder 98 only when the synchronization pulse pattern $s(t)$ is applied to the pulse pattern converter 49 while in case an arbitrary pulse pattern $a(t)$ is applied on an average half of the number of pulses from the desired series of equidistant pulses is missing on the basis of the uncorrelated condition of $a(t)$ and $s(t)$. In the synchronism detector 34 shown in FIG. 5 the pulse series at the output of the pulse pattern converter 49 is used in the manner already described elaborately with reference to FIG. 3, to obtain synchronism.

In this manner a synchronism detector is obtained which distinguishes a received synchronization pulse pattern in a particularly clear and unambiguous manner so that the reliability of the resulting synchronism is particularly great.

FIG. 6 shows a variation of the synchronism detector 34 shown in FIG. 5 which is constructed entirely digitally and in which corresponding elements are referred to by the same reference numerals. The synchronism detector 34 shown in FIG. 6 differs from that shown in FIG. 5 in its construction of the modulation device 90 and the control of the local pulse pattern generator 37′, while also the function of the integration circuit 50 for the series of equidistant pulses and the integrating network 91 in the loop for the automatic phase correction of the local pulse pattern generator 37′ are combined.

In the synchronism detector shown in FIG. 6 the modulator 98 of FIG. 5 forms part of the automatic phase correction loop. The modulation device 90 has for that purpose a single construction namely in the form of one modulo-2-adder 99 in which the received pulse pattern is applied to one input and the local synchronization pulse pattern is applied to the other input through an inverter 100. The desired series of equidistant pulses occurs at the output of the modulo-2-adder 99 only when the local and the received synchronization pulse patterns are applied in the same phase to the modulo-2-adder 99, while in other cases on an average half of the number of pulses from said series of equidistant pulses is missing. The series of output pulses of the modulation device 90 is directly applied to the integration circuit 50 which also serves as an integrating network 91 (compare FIG. 5) for the automatic phase correction loop and is handled therein in the manner described above, with this difference, however, that the integration time now is a little shorter than the period T of the synchronization pulse pattern, for example, is equal to 28D, where D is the channel clock pulse period.

The local pulse pattern generator 37′ is controlled by the local channel clock pulses originating from the 16-counter 24. For the automatic phase correction of the local pulse pattern generator 37′ the fact is used that the shift register 38′ traverses per period T of the synchronization pulse pattern 31 various conditions which each occur only once per period. One particular condition, in this case that condition in which no pulse appears simultaneously at all the shift register elements 39′ to 43′, is now used to interrupt the control of the local pulse pattern generator 37′ each time after a period T=31D for one channel clock pulse period D, as long as the received and the local synchronization pulse patterns are not in phase, in other words to delay the local synchronization pulse pattern over a time interval D with respect to the received synchronization pulse pattern. The outputs of all the shift register elements 39′–43′ are for that purpose connected to an AND-gate 106 through inverters 101, 102, 103, 104, 105, which AND gate supplies a pulse only when the above-mentioned shift register condition occurs, said pulse being applied, through a normally opened inhibitor 107, as a reset pulse to a control circuit 108 having a bistable trigger 109 to which also the local channel clock pulses are applied as set pulses to hold the trigger 109 in its operating condition. The output of the trigger 109 in which in the operating condition a signal occurs is connected to the AND-gate 110 to which are also applied the channel clock pulses for controlling the local pulse pattern generator 37′. Furthermore, the inhibiting terminal of the inhibitor 107 is connected to the output of the integration circuit 50, while the output of the inhibitor 107 is connected to an OR-gate 111 to which also the test pulses of the counter 53 are applied. By means of a buffer stage 112 it is ensured that a test pulse always coincides with an output pulse of the AND-gate 107. The buffer stage 112 comprises a bistable trigger 113 to which the test pulses are applied as set pulses and the output pulses of the AND-gate 106 are applied as reset pulses, the trigger 113 in its operating condition holding an AND-gate 114 opened to which also the output pulses of the AND-gate 106 are applied. The repetition period of the test pulses has been chosen to be larger in this case than the number of different conditions of the shift register 38′ times the integration time of the integration circuit 50, so in this case larger than 31×28D. The output pulses of the OR-gate 111 are used as reset pulses of the counter 67 in the integration circuit 50.

When a synchronization pulse pattern is received with which the local synchronization pulse pattern is not in phase, or when an arbitrary other signal pulse pattern is received, the counter 67 in the integrating circuit 50 cannot reach its final position and consequently the inhibitor 107 is opened. The control of the local pulse pattern generator 37′ is then interrupted each time after a period T for a time interval D because the output pulse of the AND-gate 106 which is then passed without hindrance through the inhibitor 107 resets the trigger 109 to its rest position as a result of which the AND-gate 110 is closed for the local channel clock pulses. The next following local channel clock pulse sets the trigger 109 to its operating position again in which the local channel clock pulses for controlling the local pulse pattern generator 37′ are passed without hindrance until a next output pulse of the AND-gate 106 appears. The delay of the local synchronization pulse pattern over a time interval D produced by the interruption of the control is repeated until the local synchronization pulse pattern is in phase with a received synchronization pulse pattern.

In that case the counter 67 in the integration circuit 50 reaches its final position within the time interval T as a result of which the output signal of the counter 67 on the one hand holds the counter 67 in its final position until the occurrence of a following test pulse and on the other hand prevents a further phase correction of the local pulse pattern generator 37′ by closing the inhibitor 107. The local pulse pattern generator 37′ is thus stabilized at the phase of the received synchronization pulse pattern. The buffer stage 112 prevents that, when phase stabilization is just reached, a test pulse would occur before the counter 67 in the integration circuit 50 has reached its final position and would thus prematurely interrupt the phase stabilization and the synchronism obtained.

Figure 7:
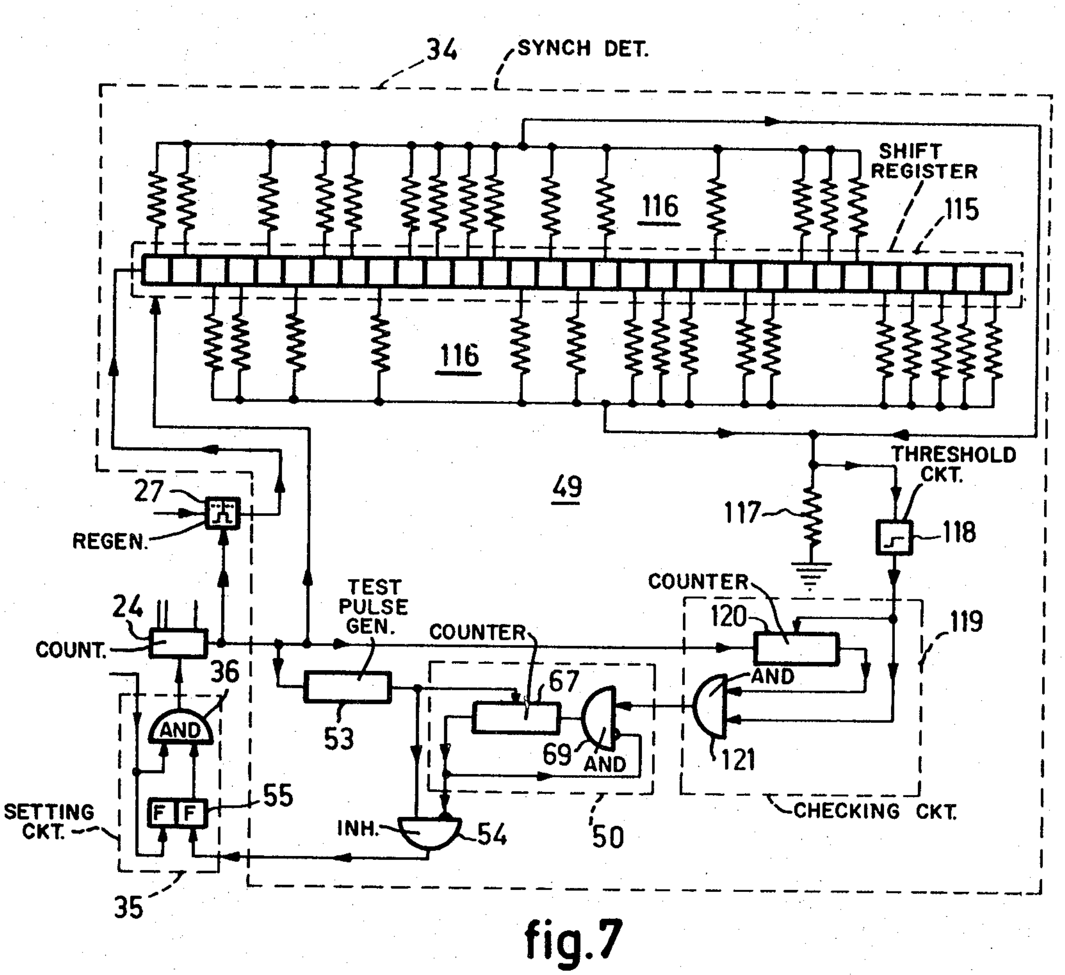

FIG. 7 shows a particularly attractive synchronism detector, in which the uncorrelated condition of the synchronization pulse pattern and any other signal pulse pattern is used in a manner differing slightly from that of FIGS. 5 and 6 for the construction of the pulse pattern converter 49. In as far as elements in FIG. 7 correspond to elements already described in the preceding Figures, they have been given the same reference numerals.

The pulse pattern converter shown in FIG. 7 comprises a shift register 115 which is provided with a number of shift register elements, so in this case 31, corresponding to the number of channel clock pulse periods in the synchronization pulse pattern the contents of which elements are shifted under the control of the local channel clock pulses; said control is not shown in FIG. 7 to avoid complexity of the drawing. The outputs of all the shift register elements are connected, through a resistance network 116 with mutually equal resistances, to a combination device in the form of a resistor 117, the resistors being connected to the shift register elements in such manner that the resistance network 116 forms a replica of the synchronization pulse pattern $s(t)$ in a given phase, for example, in FIG. 7, a replica for the phase the pulse pattern $s(t)$ shown at $a$ in FIG. 2. For that purpose each shift register element in which a pulse is present, so has a content 1, when a shift register content corresponds to the synchronization pulse pattern in the said phase, is directly connected with its output to its associated resistor, whereas each shift resistor element in which then a pulse is absent, so has a content 0, is connected with its output to its associated resistor through an inverter. When using bistable trigger as shift register elements, the inverters may be omitted, however, since both the pulses and the inverted pulses can be derived from this type of shift register elements.

The supply of the synchronization pulse pattern to said pulse pattern converter 49 then results in an output signal of the combination device 117, which has a maximum value when the synchronization pulse pattern is present in the shift register 115 in the desired phase, and has a constant minimum value when the synchronization pulse pattern is present in the shift register 115 in another phase. When the time shift of the synchronization pulse pattern relative to that in the desired phase is denoted by $\tau$, then the output signal of the combination device as a function of $\tau$ has the variation shown at 0 in FIG. 2. A series of equidistant pulses having an amplitude equal to the maximum value and a period T which is equal to that of the synchronization pulse pattern thus appears at the output of the combination device. When any other signal pulse pattern is applied on the contrary, a stepwise varying signal will appear at the output of the combination device 117 which, in the basis of the uncorrelated condition with the synchronization pulse pattern, remains far below the maximum value.

A threshold device 118, the threshold value of which is adjusted, for example, at 0.8 times the maximum value of the output signal of the combination device 117, taking into account the given probability of interference, is connected to the combination device 117. A series of equidistant pulses which now has a period T, appears at the output of the threshold device 118 only when the synchronization pulse pattern is applied to the pulse pattern converter 49. This pulse series is used in the manner described above, to obtain synchronism. As a result of the larger period of the series of equidistant pulses, the counter 67 in the integration circuit 50 need now have only a small number of stages.

In order to increase the reliability of the resulting synchronism which is large as it is, a checking circuit 119 preceding the integration circuit 50 is provided to check the periodicity of the pulse series presented for integration. This checking circuit 119 is constituted in FIG. 7 by a counter 120 in which the local channel clock pulses are counted and to which the output pulses of the threshold device 118 are applied as reset pulses. This counter 120 reaches its final position after 31 channel clock pulses, so after a period T, and then supplies a pulse to an AND-gate 121; after the counter 120 has reached its final position, it returns to its initial position. The output pulses of the threshold device 118 are applied as gate pulses to the other input of the AND-gate 121.

In general, the counter 120 is in an intermediate position when the first output pulse of the threshold device 118 appears so that said output pulse is not passed when by the AND-gate 121. This first output pulse also resets the counter 120 to its initial position. If the series of output pulses of the threshold device 118 is the desired equidistant pulse series, the second and following pulses of the said desired pulse series reach the AND-gate 121 at the instant the counter 120 reaches its final position and are then passed indeed by the AND-gate 121. Accidental output pulses of the threshold device 118 the probability of occurrence of which is particularly small are not passed by the said checking circuit 119, since the said output pulses do not have the desired periodicity.

In this manner a particularly attractive synchronism detector is obtained which very rapidly distinguishes a received synchronization pulse pattern as a result of which the integration time can be reduced to, for example, 2 periods of the synchronization pulse pattern and consequently a very short searching time can be realized, and which nevertheless ensures a very reliable synchronism in spite of the short integration time.

What is claimed is:

1. A transmitter for a plurality of information signals comprising a clock pulse generator; means coupled to said clock generator and having a plurality of inputs to receive said information signals respectively for time multiplexing said information signals into a series of transmitted pulse coinciding with the clock pulses; the improvement comprising a source of pseudorandom synchronization signals coupled to one of said multiplexing means inputs for being transmitted thereby; said synchronization signal source comprising a shift register having a plurality of serially coupled elements coupled to said clock pulse generator for controlling the shifting of said register; shift register feedback means including a first modulo-2-adder coupled to said register; an AND gate having a plurality of inputs coupled to the said shift register elements respectively and an output; and an inhibit circuit having an input coupled to the output of said register, an inhibit input coupled to the said AND gate output, and an output coupled to one of said multiplexing means inputs and to said feedback means.

2. A transmitter as claimed in claim 1 wherein said synchronization signal source further comprises a second modulo-2-adder having an output coupled to the input of said shift register, a first input coupled to the output of said first modulo-2-adder, and a second input; and a source of constant amplitude pulses coupled to said second input.

3. A transmitter as claimed in claim 1 further comprising a plurality of delta modulators having inputs coupled to receive said information signals respectively, outputs coupled to said multiplexing means inputs respectively, and timing inputs coupled to said clock generator.

4. A transmitter as claimed in claim 1 wherein said multiplexing means further comprises a counter coupled to said clock generator; a distributor coupled to said counter; and a commutator coupled to said distributor.

5. A receiver for receiving time multiplexed signals comprising means for extracting clock pulses from said received signals; means for cyclically distributing said received signals into separate channels in accordance with said extracted clock pulses; a synchronization detector means coupled to one of said channels for supplying a pulse when no synchronization signals are being received; and setting circuit means for causing said distributor to be set to a different channel from that which said distributor was set to in a corresponding time interval of the time multiplex cycle; wherein the improvement comprises said synchronization detector comprising means for converting a selected received pseudorandom pulse pattern into a series of equidistant pulses including a converter shift register coupled to said clock pulse extractor and to one of said channels, an integrating network coupled to the output of said register, and a threshold device coupled to the output of said integrating network; means for generating test pulses having a repetition period longer than that of the integration time of said integrating network and said threshold device; and a detector inhibitor having an inhibiting input coupled to the output of said threshold device, a second input coupled to the output of said test pulse generator, and an output coupled to said setting circuit.

6. A receiver as claimed in claim 5 wherein said test pulse generator comprises a test counter coupled to said clock generator.

7. A receiver as claimed in claim 6 wherein said distributor further comprises a distributor counter coupled to said test counter.

8. A receiver as claimed in claim 5 wherein said integrating network and threshold device comprises an integration inhibitor having an input coupled to said converter shift register output, an output, and an inhibit input; an integration counter having an input coupled to said integration output, a reset input coupled to said test pulse generator output, and an output coupled to said integration inhibitor inhibit input.

9. A receiver as claimed in claim 5 wherein said converter shift register further comprises shift register elements and feed-forward means including a plurality of modulo-2-adders coupled to said elements whereby various input-output paths in said shift register are created, said shift register being the inverse of a shift register needed to generate said selected pseudorandom pulse pattern.

10. A receiver as claimed in claim 9 further comprising an AND gate having a plurality of inputs coupled to said converter shift register elements respectively; and an inhibitor having an input coupled to said shift register output, and an inhibit input coupled to said AND gate output.

11. A receiver as claimed in claim 5 wherein said converter shift register comprises a plurality of shift register elements equal in number to the length of said synchronization signal in clock pulse periods; and a modulo-2-adder having inputs coupled to the input and output of said shift register.

12. A receiver as claimed in claim 9 further comprising an interference correction circuit coupled between said pulse pattern converter and said integration circuit.

13. A receiver as claimed in claim 12 wherein said interference correction circuit comprises a correction shift register having shift register elements which exceed in number the number of shift register elements in said converter shift register by one and a shift input coupled to receive said extracted clock pulses; a plurality of modulo-2-adder means coupled to selected correction register elements for creating the same input-output paths as are in said converter register; an AND gate having an output coupled to one of said modulo-2-adders, and a plurality of inputs; a plurality of inverters coupling said selected correction register elements to said AND gate inputs respectively; the remaining correction register elements being coupled to the remaining AND gate inputs respectively.

14. A receiver as claimed in claim 12 wherein one of said converter register adders is located between the first and second elements thereof and said interference correction circuit comprises an extra shift register element coupled to said converter register output; an inverter coupled to said extra element; a correction AND gate having inputs coupled to said inverter and the output of said integration circuit respectively and an output coupled to said adder located between said first and second elements.

15. A receiver as claimed in claim 14 further comprising a bistable trigger having a reset input coupled to said first inhibitor output, a set input coupled to said integration counter output, and an output coupled to one of said correction AND gate inputs.

16. A receiver as claimed in claim 5 wherein said converter register comprises means for generating a local pseudorandom signal corresponding to said received pseudorandom signal; and said converter further comprises modulator means for phase locking said converter register with said received pseudorandom signal.

17. A receiver as claimed in claim 16 wherein said modulator comprises a frequency determining member coupled to said converter register through said integration network and said threshold device.

18. A receiver as claimed in claim 16 further comprising a means for controlling said local generator from said extracted clock pulses, said control means being closed upon phase synchronization of said received and local synchronization pulses and being open for at least one clock pulse period upon a selected condition of said local generator.

19. A receiver as claimed in claim 5 wherein said converter register comprises shift register elements equal in number to the clock pulse periods of said synchronization signal; said converter further comprising a plurality of resistors coupled to said elements respectively, a combination device coupled to said resistors; and a second threshold device coupled between said combination device and said integration circuit.

20. A receiver as claimed in claim 19 further comprising a checking circuit coupled between said second threshold circuit and said integration circuit.

21. A receiver as claimed in claim 20 wherein said checking circuit comprises a checking counter having a reset input coupled to said second threshold circuit, an input coupled to receive said extracted clock pulses, and an output; and a checking AND gate having inputs coupled to said checking counter output and said second threshold circuit respectively; and an output coupled to said integration circuit input.

22. A transmission system for a plurality of information signals comprising a transmitter and a receiver coupled thereto, said transmitter comprising a clock pulse generator; means coupled to said clock generator and having a plurality of inputs to receive said information signals respectively for time multiplexing said information signals into a series of transmitted pulses coinciding with the clock pulses; the improvement in said transmitter comprising a source of pseudorandom synchronization signals coupled to one of said multiplexing means inputs for being transmitted thereby; said receiver comprising means for extracting clock pulses from the received signals; means for cyclically distributing said received signals into separate channels in accordance with said extracted clock pulses; a synchronization detector means coupled to one of said channels for supplying a pulse when no synchronization signals are being received; and setting circuit means for causing said distributor to be set to a different channel from that which said distributor was set to in a corresponding time interval of the time multiplex cycle; wherein the improvement in said receiver comprises said synchronization detector comprising means for converting the received pseudorandom pulse pattern into a series of equidistant pulses a converter shift register coupled to said clock pulse extractor and to one of said channels, an integrating network coupled to the output of said register; and a threshold device coupled to the output of said integrating network; means for generating test pulses having a repetition period longer than that of the integration time of said integrating network and said threshold device; and a detector inhibitor having an inhibiting input coupled to the output of said threshold device, a second input coupled to the output of said test pulse generator, and an output coupled to said setting circuit.

* * * * *